United States Patent [19]
Bruck et al.

[11] 3,828,129
[45] Aug. 6, 1974

[54] POLYCHROME TELEVISION RECORDING AND PLAYBACK SYSTEM

[75] Inventors: George Bruck, Riaz, Switzerland; Yves C. Faroudja, Sunnyvale; Philip Smaller, Palo Alto, both of Calif.

[73] Assignee: Avco Corporation

[22] Filed: July 5, 1972

[21] Appl. No.: 269,103

[52] U.S. Cl. .......................... 178/5.4 CD, 178/6.6 A
[51] Int. Cl. .............................................. H04n 9/02
[58] Field of Search ...... 178/5.4 CD, 6.6 A, 5.4 CF, 178/5.4 TC

[56] References Cited

UNITED STATES PATENTS

| | | | |
|---|---|---|---|
| 3,272,916 | 9/1966 | James | 178/5.4 TC |
| 3,654,385 | 4/1972 | Flagle | 178/6.4 CD |

*Primary Examiner*—Richard Murray
*Attorney, Agent, or Firm*—Lowe and King

[57] ABSTRACT

A system for recording and displaying a polychrome video signal is disclosed. A monochrome camera including a tricolor filter sequentially derives first and second chroma image fields and a third, basically luminance, image field. Three spaced rotating magnetic recording heads respectively respond to the three fields to apply signals to a tape moving past the heads in such a manner that diagonal tracks are recorded on the tape. Each diagonal track includes signals from the three sequentially derived fields. Odd numbered lines of the first chroma field are interspersed with even numbered lines of the second chroma field along a track. Superimposed on the lines of the two chroma fields are all of the lines from the luminance field. Chroma signals modulate a low frequency carrier, luminance signals modulate a high frequency carrier. The two carriers are recorded along the same track. In a preferred mode of execution, frequency modulation is used for chroma and luminance signals. In playback, the tape is swept past three rotating heads so that each track is read out three times. The chroma and luminance signals from each track are separated after being read out by each head. The chroma lines are processed so that, at any time, instant signals derived from a pair of adjacently numbered lines of successive chroma fields are simultaneously derived. Signals recorded along the same track from adjacently numbered lines from adjacent chroma fields are combined with the superimposed luminance signal to form an NTSC signal.

13 Claims, 4 Drawing Figures

POLYCHROME TELEVISION RECORDING AND PLAYBACK SYSTEM

FIELD OF INVENTION

The present invention relates generally to polychrome television recording and playback, and more particularly to polychrome television recording and playback wherein alternate lines of different chroma fields are recorded with luminance information on a magnetic tape.

BACKGROUND OF THE INVENTION

Modern television receivers respond to a standard NTSC signal including simultaneous components indicative of two chromas and luminance information regarding an image. The NTSC signal is generally formed by providing three color cameras, one for each of the primary colors (red, blue and green). Outputs from the three cameras are simultaneously derived and combined in a manner to form the chroma and luminance components. Studio systems for recording the NTSC signal for possible future transmission or viewing generally respond to an exact replica of the originally derived NTSC signal and whereby require an extensive amount of magnetic tape. For certain industrial and all home recording applications the amount of magnetic tape required to record a standard NTSC signal is prohibitive. In addition, the expense of three color cameras and the optical systems required for them is generally excessive insofar as these applications are concerned.

SUMMARY OF THE INVENTION

In accordance with the present invention, the aforementioned disadvantages of conventional polychrome cameras and recording systems are obviated, without deteriorating signal level to an unacceptable level for home entertainment and certain industrial purposes. The system of the present invention enables a standard NTSC signal to be derived so that the camera and recording system can be utilized with conventional home television receivers.

These results are attained by utilizing a monochrome camera tube in combination with a tri-color filter arranged so that successive fields derived from the tube represent different color information; preferably a first field represents color information regarding a first chroma, a second field represents information regarding a second chroma and a third field basically represents luminance information. The signals derived from the camera tube are applied to three rotating recording heads about which a magnetic tape is helically moved so that diagonal tracks are formed on the tape. Each diagonal track includes all of the video information derived from three successive fields. Along the track alternate areas represent information from odd numbered lines of the first chroma field and the remaining areas contain information derived from even numbered lines of the second chroma field. Superimposed on the chroma lines is information from all of the lines of the luminance field.

The luminance information can be superimposed on the recorded chroma signals, while retaining a substantial portion of the chroma information, because of the magnetic recording technique employed. Chroma signals modulate a low frequency carrier, luminance signals modulate a high frequency carrier. The two carriers are recorded along the same track. The two chroma signals are recorded substantially throughout the thickness of the magnetic tape, while the luminance information is only recorded substantially on the surface of the tape. Thereby, during playback at any instant of time a signal includes first and second components, respectively representing chroma and luminance information. These components are separated and processed to derive the NTSC signal.

Because three fields are recorded along each diagonal track, the amount of tape utilized is one-third of that required for a conventional recording system responsive to an NTSC signal. While there is signal degradation in playback, it is not so great as to preclude satisfactory performance for home entertainment and certain industrial purposes.

One aspect of the playback technique is known in that it involves reading certain information from each of the tracks three times with three rotating heads, i.e., each head scans the same track once so that the same track is scanned three times. Since each track is traversed by a recording head for approximately one sixtieth of a second, a new frame is presented to a viewer once every twentieth of a second, a rate which has been found adequate for the purposes of the present invention. This aspect of the playback technique is disclosed in the copending, commonly assigned U.S. Pat. application of Philip M. Crosno, Ser. No. 50,062, filed June 26, 1970, now U.S. Pat. No. 3,718,755, issued Feb. 27, 1973.

In accordance with the present invention, during readout adjacently numbered lines from adjacent chroma fields along the same track are successively derived while each track is being scanned by one recording head. To enable information regarding adjacently numbered lines to be simultaneously derived, a delay and switching technique similar to that employed in systems utilizing SECAM is employed. The two simultaneously derived chroma signals are separately combined with a luminance signal, whereby there are derived simultaneously two chroma components and the luminance component. The two chroma components are combined to form a resultant signal utilizing well known quadrature techniques and the resultant signal is combined with the luminance signal to form the NTSC signal which a conventional polychrome television receiver is adapted to handle.

It is, accordingly, an object of the present invention to provide a new and improved polychrome television recording system.

Another object of the invention is to provide a new and improved polychrome television recording system particularly adapted for use in conjunction with a monochrome camera.

A further object of the invention is to provide a polychrome recording system wherein a monochrome camera is utilized in conjunction with a magnetic tape on which signals are formed for three-image fields in the space normally required for a single image field.

Another object of the invention is to provide a polychrome recording system wherein information from three successive fields, each responsive to a different component required to form a polychrome signal, is recorded as a single field on a magnetic tape.

An additional object of the invention is to provide a new and improved polychrome receiver particularly adapted to be responsive to an NTSC signal and/or a magnetically recorded signal wherein adjacently numbered lines of adjacent chroma fields are recorded on a track containing information necessary to form an image frame.

The above and still further objects, features and advantages of the present invention will become apparent upon consideration of the following detailed description of the one specific embodiment thereof, especially when taken in conjunction with the accompanying drawing.

DETAILED DESCRIPTION OF THE DRAWING

Figure 1:
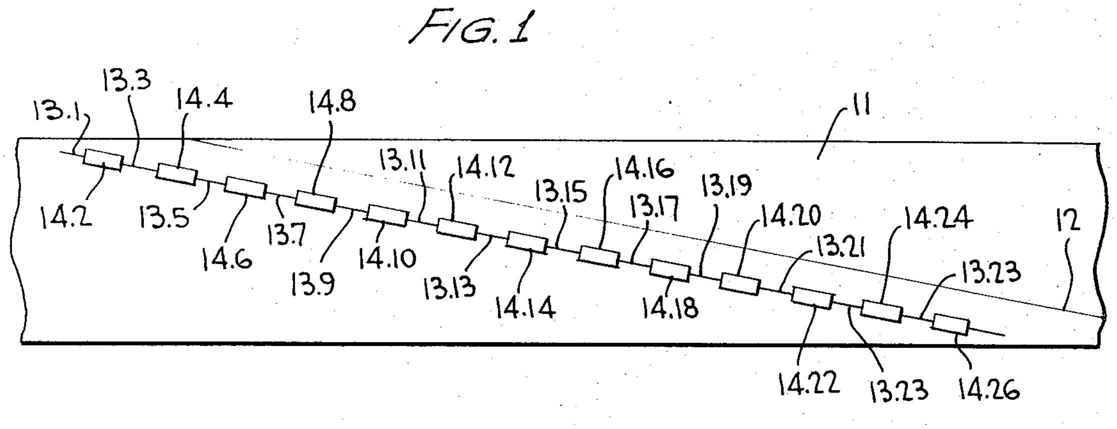
FIG. 1 is an illustration of a magnetic tape having a number of tracks recorded in accordance with the present invention.

Before considering the apparatus of the present invention, consideration will be given to the format of polychrome information recorded on a magnetic tape in accordance with the present invention, by referring to FIG. 1. A magnetic tape 11 is illustrated as having a number of parallel tracks 12 that extend diagonally in a direction between parallel edges of the tape. Consideration will be given in detail to track 12', as the format of the remaining tracks is the same as track 12'.

Track 12' includes information from three fields sequentially derived from a monochrome television camera. As in a conventional television system, each field has a duration of approximately one sixtieth second and has lines interlaced with an adjacent field, so that two fields are required to form a complete image. Each field derived with the system of the present invention includes 262 lines, rather than 262.5 lines as in a conventional system. To compensate for the one-half line deviation and yet provide readout as described in the aforesaid U.S. Pat. to Crosno, No. 3,718,755, adjacent tracks 12 are appropriately spaced along the length of tape 11. While this results in loss of one-half a line in playback, the loss is not generally perceived by a viewer.

Two of the fields are derived in response to components for two different chromas, while the third field is preferably derived in response to a luminance component with a tint of green. In a preferred embodiment, one of the chroma fields represents flesh tint, the second chroma field is basically blue, and the third field is basically white with a tint of light green (approximately 70 to 80 percent light green). While it has been found that these three fields most accurately represent all of the polychrome information, it is to be understood that the three sequential fields can represent other polychrome combinations required to provide a complete polychrome image; for example, the fields could be red, green and blue.

Along track 12', lines of the two chroma fields are alternately spaced; lines of the luminance field are superimposed on the lines of the two chroma fields. Half of the lines of the two chroma fields are recorded along track 12', and the remaining lines of the two chroma fields are not recorded at all. The 131 odd numbered lines of the first chroma field (field 1) are included in track 12', as represented by reference numerals 13.1, 13.3 . . . 13.25, while the even numbered lines of the second chroma field (field 2) are represented by the reference numerals 14.2, 14.4 . . . 14.26. (For purposes of simplifying the drawing, only 13 lines are shown as being recorded from each of fields 1 and 2 on track 12'.) A low frequency chroma-modulated carrier and a high frequency luminance modulated carrier are recorded along the same track.

The lines of the chroma fields are recorded to a substantial depth through the thickness of tape 11. Every line of the luminance field is recorded substantially only on the surface of track 12' over the lines of the two chroma fields. The 131 odd numbered lines of the luminance field are superimposed on the odd numbered lines of field 1 (e.g., lines 13.1–13.25), while the 131 even numbered lines of the luminance field are superimposed on the even numbered lines of field 2 (e.g., lines 14.2–14.26). Because the two chroma fields are recorded to a substantially greater depth than the subsequently recorded luminance field, signals representing all three fields can be derived by scanning a pickup head over track 12' during readout.

To derive signals to indicate that the recording technique of the invention is being employed, each line of one of the fields (e.g., the blue field) is preceded with a coded signal. The coded signal is in time coincidence with the derivation of a horizontal sync pulse from the camera. Since the coded signal occurs when a horizontal sync pulse is derived, no color information is lost by recording it. The line identification coded signal enables a receiver responsive to a signal recorded in accordance with the present invention to switch to an operating mode such that it decodes the signal recorded on tracks 12. When the receiver is not responsive to the specially coded signal of the present invention, it responds directly to a standard NTSC signal.

Figure 2:
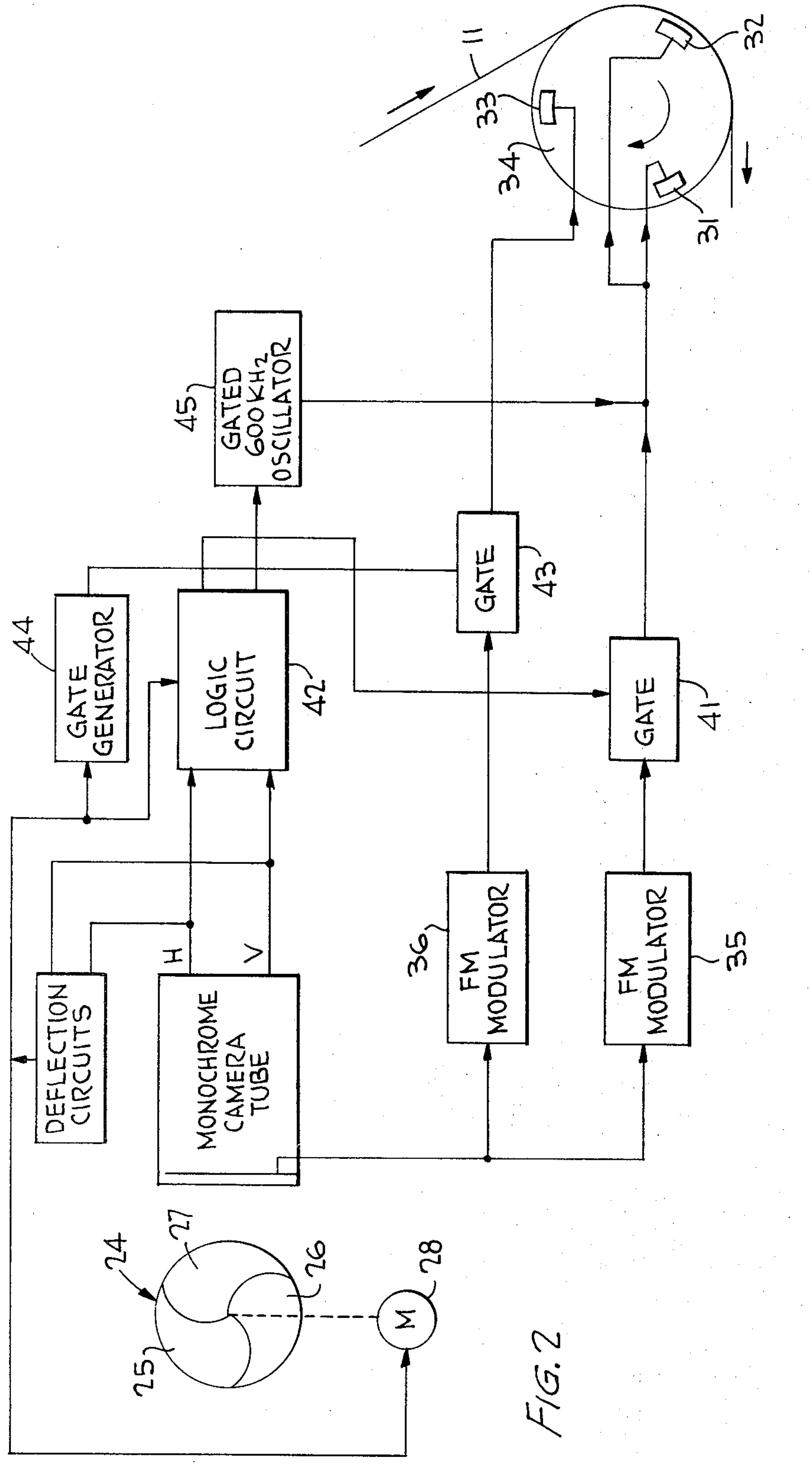
FIG. 2 is a block diagram of the recording system and camera of the present invention.

Reference is now made to FIG. 2 of the drawing wherein there is illustrated a preferred embodiment of apparatus utilized to form the diagonal tracks 12 of FIG. 1 in response to signals derived from a monochrome camera 21 which includes monochrome image responsive electrode 22. Electrode 22 is of the low lag type so that the image from one field no longer substantially persists when the next field is being scanned. Readout of the image on electrode 22 is in response to horizontal and vertical deflection signals derived from deflection circuits 23. Deflection circuits 23 also include a pulse generator for deriving a 20 Hertz synchronizing signal simultaneously with the occurrence of every third vertical sync pulse.

To enable the three sequential fields to be derived from camera 22, a tri-color filter is moved in synchronism with the formation of fields on the face of image electrode 22. The tri-color filter may comprise a conventional tri-color disc 24 or some other suitable filter, such as a tri-color cone, capable of performing the same function as the disc. In conformance with the above noted preferred arrangement for the three components, disc 24 includes a flesh colored segment 25, a blue colored segment 26 and a clear segment with a high percentage (approximately 70 percent) of light green tint. While disc 24 is illustrated as including only three segments, it is understood that in a preferred embodiment the disc includes four segments of each color, or a total of twelve different segments. Disc 24 is rotated relative to image electrode 22 by motor 28 in response to 20 Hertz synchronizing pulses derived from deflection circuits 23, whereby synchronism between the fields derived from image electrode 22 and rotation of the disc is maintained.

Signals derived from the three sequentially occurring fields are applied in sequence to three rotating recording heads 31, 32 and 33. Heads 31–33 are mounted in proximity to the periphery of drum 34 which is driven at constant speed. Heads 31–33 are spaced from each other by approximately 120°. Drum 34 and tape 11 are driven relative to each other in a manner described in the Crosno application. Recording heads 31–33 in combination with drum 34 from diagonal tracks 12 on tape 11 since the tape moves about the drum in a substantially helical path over approximately a 120° length of arc on the drum periphery. One of heads 31–33 is substantially always forming a portion of one of tracks 12 on tape 11. Head 31 initially applies the odd numbered lines of the first field, after which head 32 applies the even numbered lines of the second field, followed by head 33 applying all of the lines of the third field over the recorded lines of the first and second fields.

To enable the two chroma fields to be recorded to a substantial depth through the thickness of tape 11, approximately through the entire thickness of the tape, and the third field to be recorded to a lesser depth, i.e., on the surface of tape 11 approximately to a depth of between 15 percent to 25 percent through the tape thickness, it is important for video information derived from the three fields to be recorded without substantial change in the amplitude of the recorded magnetic flux. To this end, the video information derived from camera tube 21 is preferably modulated with a technique that does not involve substantial amplitude modulation; exemplary of such techniques are f.m. and quadrature modulations. While the recording technique is described in conjunction with f.m. modulation, it is to be understood that other suitable techniques can be employed.

To provide the necessary modulation, the output signal of image electrode 22 is applied in parallel to f.m. modulators 35 and 36. In f.m. modulator 35, the two chroma fields, which are of relatively narrow bandwidth (on the order of 500 KHz), are frequency modulated on a 600 KHz carrier. Modulator 35 includes a filter to permit only first order side bands of the modulated wave to be passed through it, whereby the modulator derives a spectrum having an upper cutoff frequency of approximately 1.1 MHz. The amplitude of the chroma signals coupled from modulator 35 to heads 31 and 32 is relatively large and the signals are of relatively low frequency so that there is recording of magnetic flux substantially throughout the thickness of tape 11. The luminance field derived from image electrode 22 has a relatively wide bandwidth (on the order of 2.5 MHz) to cause a carrier that varies between 3.2 and 4.7 MHZ to be wide band frequency modulated, in modulator 36. The 3.2 to 4.7 MHz variation in the carrier frequency derived from modulator 36 occurs in response to luminance information derived from image tube 22 during field three. Modulator 36 also derives side bands so that the total range of the modulator output signal is approximately from 1.1 MHz to 7.2 MHz. The amplitude of the signals derived from modulator 36 is limited and these signals are of relatively high frequency, so that they are substantially only recorded on the surface of tape 11.

To enable only the odd lines of the first chroma field and only the even lines of the second chroma field to be coupled to record heads 31 and 32, gate 41 is provided. Gate 41 selectively passes the chroma indicating output signals of f.m. modulator 35 in response to control, gating signals derived by logic circuit 42, described infra. Logic circuit 42 is responsive to the horizontal and vertical sync pulses, as well as the 20 Hertz synchronizing pulse, derived from deflection circuits 23. While the first chroma field is being derived, logic circuit 42 opens gate 41 during every odd numbered line and closes the gate during every even numbered line. In contrast, while the second chroma field is being derived, the gating signal derived from logic circuit 42 opens gate 41 during every even numbered line and closes the gate during every odd numbered line. Gate 41 is closed while the luminance field is being derived. The output of gate 41 is applied to the two chroma recording heads 31 and 32 through switching means (not shown) as disclosed in the aforesaid U.S. Pat. to Crosno, No. 3,718,755. The arrangement is such that because of synchronism between the motion of drum 34 and readout of the sequential fields from image electrode 22, the output of gate 41 for the lines of the first chroma field occurs while head 31 is in proximity with tape 11 and the output of gate 41 for the lines of the second chroma field occurs while head 32 is adjacent tape 11.

The output of f.m. modulator 36, indicative of the luminance information, is applied to record head 33 through gate 42. Gate 43 is driven to an open condition by the output signal of gate generator 44, which in turn is driven by the 20 Hertz synchronizing signal. Gate generator 44 derives a rectangular pulse having a duration of one field and a time coincident with the derivation of the luminance field, as derived from image electrode 22. To provide the blue field identification pulses, logic circuit 42 derives an output pulse having a duration substantially equal to and in time coincidence with a horizontal sync pulse. The output pulse is derived only while the second chroma field (the blue field) is being read out from image electrode 22. The blue field identification pulses drive gated oscillator 45 so that the oscillator derives a relatively narrow, constant frequency (600 KHz) burst, which occurs in time coincidence with the horizontal sync pulses of the blue field. The constant frequency burst derived from gated oscillator 45 is combined with the output of gate 41 and applied to tape 11 by head 32.

Figure 3:
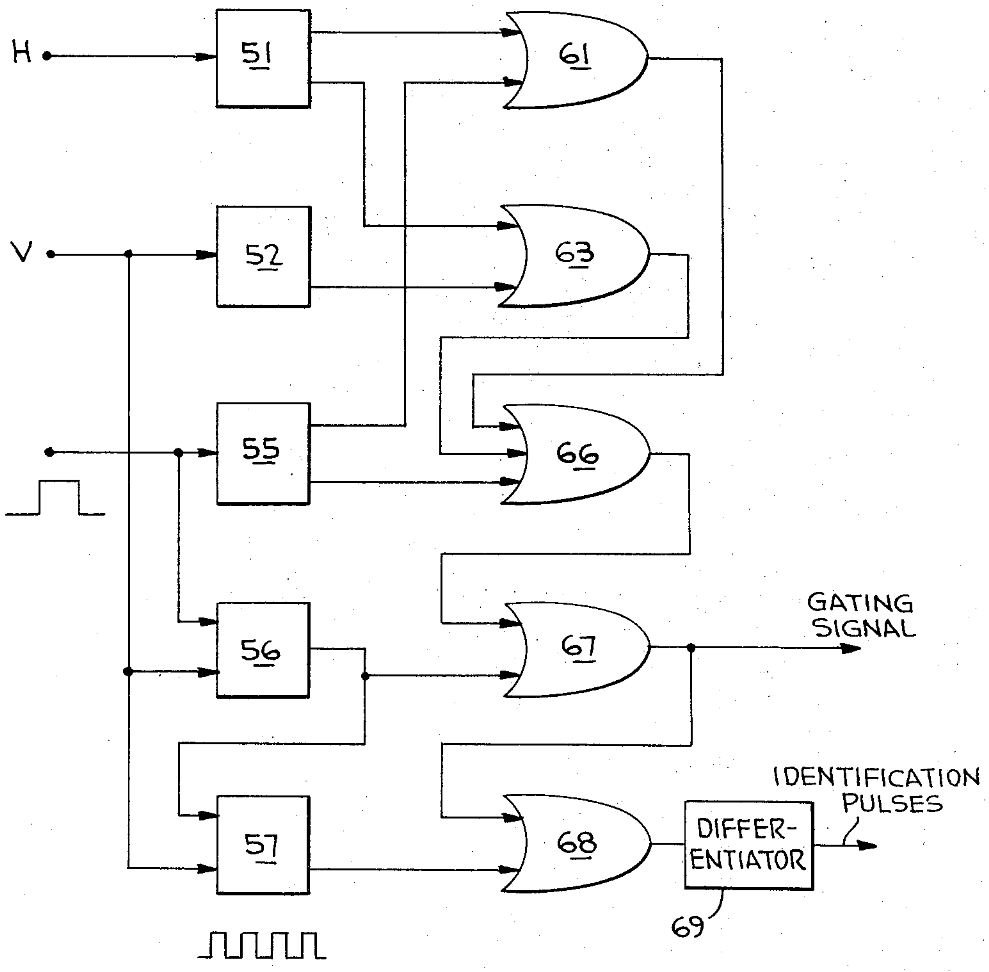
FIG. 3 is a block diagram of a circuit included in the system of FIG. 2.

Reference is now made to FIG. 3 of the drawing wherein there is illustrated a schematic diagram of logic circuit 42. The circuit of FIG. 3 includes a five J-K flip-flops of a well known type including a trigger input, set and reset inputs, and a pair of complementary outputs. The flip-flops, once activated into a set or reset state remain in that state until a subsequent input pulse is applied to the trigger input or to the complementary set or reset input.

Flip-flops 51 and 52 include trigger inputs respectively responsive to horizontal and vertical sync pulses derived from deflection circuits 23. As each line is being scanned across the face of image electrode 22, the state of flip-flop 51 is changed; the state of flip-flop 52 is changed as each new field is being scanned across the image electrode. Thereby, for all even numbered lines of all fields, flip-flop 51 is activated to a set state; for all odd numbered lines, flip-flop 51 is activated to a reset state. At the time while an even numbered line is being scanned by monochrome tube 21, a binary one level is derived by flip-flop 51 on lead 53, while a binary one level is derived by the flip-flop on lead 54 when an odd numbered line is being scanned. The trigger input of J-K flip-flop 55 is responsive to the short duration 20 Hertz sync pulse derived in time coincidence with the beginning of each luminance frame so that the flip-flop changes state once every three frames. Set and reset inputs of J-K flip-flop 56 are respectively responsive to the vertical and 20 Hertz synchronizing pulses. Thereby, during frame three while luminance information is being read from camera 21, flip-flop 56 is always in a reset state; flip-flop 56 is always in a set state while the two chroma frames are being scanned and read out from camera 21.

To enable the blue field identification pulses to be derived at the beginning of each line, flip-flop 57 includes reset and set inputs respectively responsive to the output of flip-flop 56 and the vertical sync pulse signal derived from deflection circuits 23. Thereby, flip-flop 57 is activated to the set state only while the second, i.e., blue, field is being derived.

Coincidence gate 61 includes a pair of input terminals responsive to the set outputs of flip-flops 51 and 55, as respectively derived on leads 53 and 62. Thereby, in response to flip-flop 55 being activated to the set state in response to the 20 Hertz sync pulse, the output of gate 61 is a rectangular waveform having a frequency equal to half the horizontal sweep frequency. The rise and fall times of the waveform derived by flip-flop 55 are substantially coincident with the beginning and end of each line of a frame. The rectangular waveform is derived from gate 61 for a period of three frames and is then terminated for a second series of three frames while flip-flop 55 is activated to a reset state. Gate 63 is responsive to the reset outputs of flip-flops 51 and 52, as coupled to the gate via leads 54 and 64, respectively. Thereby, during alternate frames, gate 63 derives a rectangular waveform having a frequency equal to half the frequency of a line, with rise and fall times coincident with the beginning and end of each line. The rectangular waveform derived from gate 63 is phase reversed relative to the rectangular waveform derived from gate 61. The rectangular waveform is not derived from gate 63 during the frames while flip-flop 52 is activated to the set state.

The outputs of gates 61 and 63, as well as the reset output of flip-flop 55 on leads 63, are fed to inputs of coincidence gate 66. The output of coincidence gate 66 is combined in coincidence gate 67 with the set output of flip-flop 55 derived on lead 68. Thereby during the first chroma field gate 67 derives a rectangular waveform having a frequency equal to half the frequency of the horizontal sync pulses, with rise and fall times coincident with the odd numbered lines of the first chroma field, i.e., binary one values are derived from gate 67 while odd numbered lines are being scanned by camera 21. During the second chroma field, gate 67 derives a rectangular waveform having a frequency equal to half the frequency of the horizontal sync pulses with rise and fall times coincident with the beginning and end of every even numbered line, i.e., binary one levels are derived by gate 67 for the duration of each even numbered line of the second chroma field. Binary zero levels are derived by gate 67 for the durations of the even numbered lines of the first chroma field and for the durations of the odd numbered lines of the second chroma field. While the third, luminance field is being derived, flip-flop 56 is in a reset state, whereby the output of gate 67 is at a binary zero level for the duration of the luminance field.

The binary one signals derived during the second chroma field are fed through gate 68 since flip-flop 57 is activated to a reset state at this time. At all other times, during fields one and three, the output of gate 68 is at a binary one level. The positive going portions of the rectangular waveform derived at the output of gate 68 are shaped into relatively narrow pulses by differentiator 69, having an input connected to be responsive to the output of gate 68.

The gating signal derived from an output of gate 67 is applied to gate 41 of the system illustrated in FIG. 2. The output of differentiator 69, a gating waveform for the third, or blue field, identification pulses, is fed to gated oscillator 45 to activate the oscillator into a conducting state for the relatively short time duration substantially equal to and in time coincidence with the blue field horizontal sync pulses.

Figure 4:
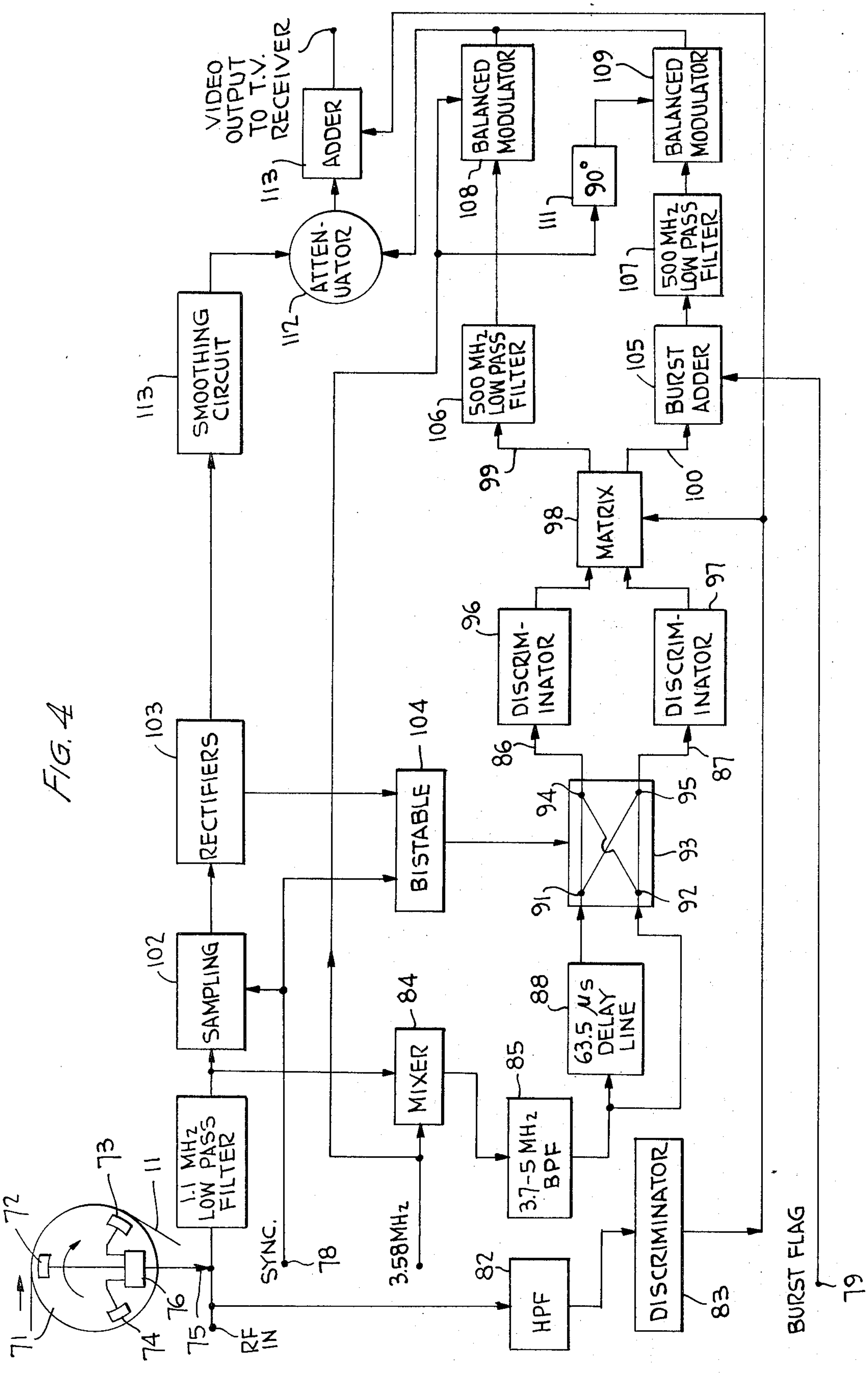
FIG. 4 is a block diagram of a playback device and encoding equipment adapted to be utilized with the present invention and a conventional polychrome television receiver.

Reference is now made to FIG. 4 of the drawing wherein there is illustrated a block diagram of apparatus for decoding the signal recorded on tape 11. Tape 11 is translated over an arc of slightly in excess of 120° about the periphery of drum 71 which includes three, approximately equi-spaced pickup heads 72, 73 and 74, as described in the Crosno application. Tape 11 moves relative to drum 71 in the same manner as described supra with regard to movement of the tape relative to recording heads 31–33 on drum 34, and as described in the Crosno application, whereby heads 72–74 describe helical tracks that coincide with recorded tracks 12 on tape 11. After one track 12, e.g., track 12′, has been completely read out by one head, e.g., head 72, the drum and tape positions are such that a second head, e.g., head 73, is at the beginning of the same recorded diagonal track 12′. In this manner, heads 72–74 successively read out the same track 12′ on tape 11 so that the same track is played back three times.

The playback signals derived from heads 72–74 are fed to a common output lead through a playback switching mechanism. Switching mechanism 76 is activated so that the signal from only one of heads 72–74 is fed through it at a time; the selection of the head is determined by which head is reading out a track 12 of tape 11, in a manner described in the Crosno application.

In synchronism with readout of signals from heads 72–74, horizontal and vertical synchronizing (sync) pulses and a color burst flag are derived in a manner described in the aforesaid U.S. Pat. to Crosno, No. 3,718,755. The horizontal sync pulses are applied to terminal 78, while the color burst flag signal is applied to terminal 79.

The video signal derived on lead 75 includes, at a particular time instant, first and second components.

The first component of the video signal is a relatively narrow band f.m. signal extending between 100 KHz and 1.1 MHz on a 600 KHz carrier. It is indicative of the chroma information in a line being scanned by one of heads 72–74. As the head moves along the selected track 12' of tape 11, adjacently numbered, successive lines of alternate chroma fields are read out so that the first component is successively indicative of the information included in the lines represented on FIG. 1 by reference numerals 13.1, 14.2, 13.3, 14.4, 13.5, 14.6, etc. Hence, information from the sequentially derived chroma fields of camera 21 is read out during the same playback field.

The second component derived on lead 75 is indicative of luminance field information existing on track 12'. This information has a spectrum between 1.1 and 7.2 MHz. The odd numbered lines of the luminance field are derived simultaneously with the information for the odd numbered lines of the first chroma field, while the even numbered lines of the luminance field are derived simultaneously with the even numbered lines of the second chroma field.

To separate the simultaneously occurring chroma and luminance signals, the signal on lead 75 is applied in parallel to low pass filter 81 and high pass filter 82, each of which filters has a cut off frequency of approximately 1.1 MHz. Thereby, the output of filter 81 includes the chroma information, to the exclusion of the luminance information, and the output of filter 82 includes the luminance information to the exclusion of the chroma information. The f.m. signal derived from high pass filter 82 is converted into an a.m. signal by discriminator 83, having an output spectrum with the same characteristics as the spectrum of the luminance component of an NTSC signal.

It is necessary to convert the narrow band, relatively low frequency chroma signals into signals having a frequency compatible with chroma signals included in receivers responsive to the NTSC signal. To this end, the output of filter 81 is frequency translated from a 600 KHz carrier to a 4.2 MHz carrier by hetrodyning in mixer 84, that is also responsive to a 3.58 MHz source that is included in conventional polychrome television receivers. The upper sideband derived from mixer 84 is passed through band pass filter 85, having a pass band range of 3.7 to 5 MHz.

The output signal of filter 85 is processed so that at any time instant there are derived on separate leads 86 and 87 signals indicative of the polychrome information in adjacently numbered lines of two different adjacent chroma fields. To this end, the output of filter 85 is applied to delay line 88, having a delay time of one line (63.5 microseconds). The outputs of filter 85 and delay line 88 are applied to input terminal 91 and 92 of electronic reversing switch 93. As described infra, switch 93 is activated in synchronism with the coupling of each line of the adjacent chroma fields to terminals 91 and 92. Switch 93 is activated so that during a first 63.5 microsecond time interval (the time required for readout and display of one line) input terminals 91 and 92 are respectively connected to output terminals 94 and 95, while during a second one-line time interval terminals 91 and 92 are respectively connected to terminals 95 and 94. Reversing switch 93 thereby functions in conjunction with delay line 88 in a manner similar to a SECAM reversing switch arrangement.

To consider the operation of switch 93 and delay line 88, assume that line two of field two (the second chroma field) is being read out from tape 11 and fed to lead 75. Thereby, line one of field one (the first chroma field) is being supplied to terminal 91 and line two of field two is being supplied to terminal 92. Also assume that switch 93 is activated so that terminal 91 is connected to terminal 94 and terminal 92 is connected to terminal 95. Under these conditions, the field one, line one signal is derived at terminal 94 and the field two, line two signal is derived at terminal 95. Next, assume that tape 11 has moved so that line three of field one is being read out, whereby switch 93 is activated so that terminals 91 and 95 are connected together, while terminals 92 and 94 are interconnected. At this time, the signals applied to terminals 91 and 92 are respectively indicative of field two, line two and field one, line three. Because of the state of switch 93, the signal derived at terminals 94 and 95 are respectively indicative of field one, line three and field two, line two. From the foregoing description, it is believed evident that the signals derived on leads 94 and 95 are always respectively responsive to images while fields one and two were being scanned. Because of the action of delay line 88, the signal derived at each of terminals 94 and 95 is repeated for a particular line. The sequence is such, however, that the signals at terminals 94 and 95 are not the same for any two-line interval; e.g., if the signal derived at terminal 95 repeats itself during two successive line periods, the signal on line 95 changes from one line to a second line in the center of the two-line period.

To enable the signals indicative of the information in fields one and two to be combined with the luminance information in field three, whereby red minus luminance and blue minus luminance signals, as derived in a conventional NTSC signal, can be generated, discriminators 96 and 97 are connected to be responsive to signals derived from terminals 94 and 95, respectively. Each of discriminators 96 and 97 demodulates the f.m. signal fed thereto to derive an a.m. chroma signal having a spectrum from d.c. to approximately 500 KHz. The output signals of discriminators 96 and 97, indicative respectively of the chroma information of fields one and two, are combined in a conventional adding matrix with the luminance information derived from discriminator 83. Matrix 98 includes a pair of output terminals 99 and 100. On terminal 99 there is derived a signal indicative of the chroma signal of field one minus the luminance signal of field three for each odd numbered line of these two fields; on terminal 100 there is derived a signal indicative of the chroma information of field two minus the luminance information of field three for each even numbered line of these two fields.

To control reversing switch 93, a square wave having a frequency of 7.5 KHz, with leading and trailing edges coincident with the beginning and end of each line is derived. To this end, the output signal of low pass filter is applied to sampling gate 102, which is also responsive to horizontal sync pulses derived on lead 78. Sampling gate 102 is opened each time a horizontal sync pulse is derived. There is a finite output of sampling gate 102, however, only at a time immediately prior to the beginning of each blue field (field two) line read from track 12' because only at that time was the 600 KHz burst recorded. When sampling gate 102 is opened in response to the horizontal sync pulses associated with fields one and three there is no substantial signal derived from low pass filter 81. Each 600 KHz burst derived from sampling gate 102 is shaped by rectifier 103 into a pulse having a duration approximately equal to a horizontal sync pulse. Each of the pulses shaped by rectifier 103 persists for a time interval slightly after the cessation of each horizontal sync pulse. The horizontal sync pulses and the pulses derived by rectifier 103 are respectively applied to set and reset inputs of bistable flip-flop 104. Because the pulses derived from rectifier 103 persist after the sync pulse has terminated, the bistable flip-flop is positively activated so that it changes state at the beginning of each line of a blue field. Thereby, flip-flop 104 derives a 7.5 KHz square wave having rise and fall times in time coincidence with the beginning and end of each line supplied to terminals 91 and 92. The square wave is supplied to reversing switch 93 to control the operation of the reversing switch.

To convert the two chroma signals derived on leads 99 and 100 into an NTSC signal, the signals on leads 99 and 100 are amplitude modulated on the 3.5 MHz carrier in a quadrature manner. One of the signals must also have the color burst flag inserted thereon. To these ends, the chroma field two minus luminance signal derived on lead 100 is combined in linear adder 105 with the color burst signal supplied to terminal 79. The output signals of color burst adder 105 and matrix 98, as derived on lead 99, are respectively applied to low pass filters 106 and 107, each of which has a cutoff frequency of approximately 500 KHz. The output signals of low pass filters 106 and 107 are amplitude modulated in balanced modulators 108 and 109 with the 3.58 MHz carrier. To achieve the quadrature effect, the 3.5 MHz carrier is shifted 90° in phase shifter 111 prior to being applied to balanced modulator 109. The carrier frequencies at the outputs of modulators 108 and 109 are thereby displaced in phase 90° relative to each other to attain the desired quadrature relationship. The output signals of modulators 108 and 109 are linearly combined and supplied, after being combined, to variable attenuator 112.

Attenuator 112 functions as a color killer if the recorded information was of a monochrome, rather than polychrome, nature. The degree of attenuation inserted by attenuator 112 is controlled in response to the derivation of the 600 KHz blue field identification burst. To this end, the output of rectifier 103 is applied to smoothing circuit 113, having a relatively long time constant (on the order of several seconds). In response to polychrome information being supplied to lead 75, smoothing circuit 113 derives a d.c. voltage having a relatively high level. In contrast, however, if monochrome information is supplied to terminal 75, whereby there are no blue field identification pulses derived, the output of smoothing circuit 113 is a relatively low level. The output of smoothing circuit 113 is applied to attenuator 112 so that if the smoothing circuit derives a high d.c. level there is virtually zero attenuation of the signals supplied to attenuator 112; if the output of smoothing circuit is a relatively low level, attenuator 112 is effective to block substantially the chroma indicating signals applied thereto.

The final operation involved in forming the NTSC signal involves combining the quadrature phase chroma indicating signal with the luminance indicating signal. To this end, the output signals of attenuator 112 and discriminator 83 are linearly combined in adding circuit 113. The output signal of adding circuit 113 is applied in parallel with an output derived from a second detector of a conventional home polychrome receiver.

While there has been described and illustrated one specific embodiment of the invention, it will be clear that variations in the details of the embodiment specifically illustrated and described may be made without departing from the true spirit and scope of the invention as defined in the appended claims.

We claim:

1. A system for recording a polychrome video signal on a magnetic recording medium comprising:
A source of video signal including sequentially derived image field components of a first chroma, image field components of a second chroma, and luminance components,
said source further including means for modulating the chroma and luminance components onto separate carriers,
means responsive to the signal for magnetically recording to a substantial depth a first set of lines of the first chroma field on first regions of the medium and a second set of lines of the second chroma field on other regions of the medium, each of said sets of lines being approximately half of the lines in the respective chroma field, and
means responsive to the signal for magnetically recording, to a depth considerably less than the substantial depth, the luminance field over the regions where the chroma fields were recorded.

2. The system of claim 1 wherein one of said sets of lines consists of even lines and the other set of lines consists of odd lines.

3. A system for recording a polychrome video signal on a magnetic recording medium comprising:
A source of video signal including components representative of three sequentially derived image fields, the first and second image field components indicative of first and second chromas, the third image field components having a relatively wide bandwidth and containing additional information necessary to form a color image,
said source further including means for modulating the chroma and wideband components onto separate carriers,
means responsive to the signal for magnetically recording, to a substantial depth, a first set of lines of the first field components on first regions of the medium and a second set of lines of the second field components on other regions of the medium, each of said sets of lines being approximately half the lines in the respective field components, and
means responsive to the signal for magnetically recording, to a depth considerably less than the substantial depth, the third image field components over the regions where the chroma fields were recorded.

4. The system of claim 3 wherein one of said sets of lines consists of even lines and the other set of lines consists of odd lines.

5. A system for recording a polychrome video signal on a magnetic recording medium comprising:
A monochrome camera tube,
a filter including three elements movable relative to an image responsive electrode of the tube whereby the tube derives in sequence image fields for the three elements,
means responsive to the camera tube for magnetically recording to a substantial depth a first set of lines from fields of the first element on first regions of the medium and a second set of lines from fields of the second element on second regions of the medium, one of said sets of lines consisting of odd lines, the other set of lines consisting of even lines, and means responsive to the camera tube for magnetically recording, to a depth considerably less than the substantial depth, even and odd lines of the fields of the third element over the regions where the corresponding lines in the fields of the first and second elements were recorded, the two above-mentioned recording means including means for separately modulating the third and the other two fields onto carriers.

6. A system for recording a polychrome video signal on a magnetic recording medium comprising:

a monochrome camera tube, a filter including three elements movable relative to an image responsive electrode of the tube whereby the tube derives in sequence image fields for the three elements, means responsive to the camera tube for magnetically recording to a substantial depth a first set of lines from fields of the first element on first regions of the medium and a second set of lines from fields of the second element on second regions of the medium, each of said sets of lines being approximately half of the lines in the respective chroma field, and means responsive to the camera tube for magnetically recording, to a depth considerably less than the substantial depth, lines of the fields of the third field over the regions where the lines in the fields of the first and second elements were recorded, the two above-mentioned recording means including means for separately modulating the third and the other two fields on to carriers.

7. A system for recording a polychrome video signal on a longitudinally moving magnetic recording tape comprising:

A source of video signal including three sequentially derived image fields, first and second of said fields being indicative of first and second chromas and the third field being indicative of additional information necessary to form a color image, three spaced rotating magnetic recording heads, said tape moving and said heads rotating such that each head traces for each field one diagonal region over the tape in a direction between edges of the tape and the three heads trace over substantially the same diagonal region for every three sequential fields, first means responsive to the signal for applying a first set of lines of one chroma field to one of the recording heads, second means responsive to the signal for applying a second set of lines of the second chroma field to the second recording head such that the first and second sets of lines are recorded on different portions of each diagonal region, one of said sets of lines consisting of even lines of one chroma field, the other set of lines consisting of odd lines of the other chroma field, said first and second means including a first modulator, and third means responsive to the signal and including another modulator for applying even and odd lines of the third field to the third recording head, the lines of the third field being applied over the corresponding even and odd lines of the two previously recorded chroma fields without modifying a substantial portion of the recorded lines of the two chroma fields.

8. A system for recording a polychrome video signal on a longitudinally moving magnetic recording tape comprising:

A source of video signal including three sequentially derived image fields, first and second of said fields being indicative of first and second chromas and the third field being indicative of additional information necessary to form a color image, three spaced rotating magnetic recording heads, said tape moving and said heads rotating such that each head traces for each field one diagonal region over the tape in a direction between edges of the tape and the three heads trace over substantially the same diagonal region for every three sequential fields, first means responsive to the signal for applying a first set of lines of one chroma field to one of the recording heads, second means responsive to the signal for applying a second set of lines of the second chroma field to the second recording head such that the first and second sets of lines are recorded on different portions of each diagonal region, said first and second means including a first modulator, and third means responsive to the signal and including another modulator for applying lines of the third field to the third recording head, the lines of the third field being applied over the lines of the two previously recorded chroma fields without modifying a substantial portion of the recorded lines of the two chroma fields.

9. A polychrome television playback system responsive to a magnetic recording tape having recorded thereon a plurality of parallel tracks running diagonally between edges of the tape, each of said tracks including first and second alternately spaced regions, said first regions including even numbered lines derived from a first chroma field and even number lines derived from a luminance field, said second regions including odd numbered lines derived from a second chroma field and odd numbered lines derived from the luminance field, said chroma fields and luminance field being derived in sequence, comprising:

Means for converting the recorded tracks into an electrical signal such that positions along the track are converted into time positions, means responsive to the signal for separating luminance field information from information from the two chroma fields, means including a line interval store for processing the lines of the separated two chroma fields so that adjacently numbered even and odd lines of the two chroma fileds are simultaneously derived, and means for combining the simultaneously derived lines with each other and a line from the separated luminance field.

10. The system of claim 9 wherein the line interval store is a delay line for deriving the same numbered line of each chroma field twice in succession so that the same numbered lines of the two chroma fields are not twice simultaneously derived.

11. The system of claim 9 wherein the means for combining includes means for forming an NTSC polychrome signal.

12. A polychrome television magnetic tape recording and playback system comprising:

Means for recording on the tape a plurality of parallel tracks running diagonally between edges of the tape, each of said tracks including first and second alternately spaced regions, said first regions including even numbered lines derived from a first chroma field and even numbered lines derived from a luminance field, said second regions including odd numbered lines derived from a second chroma field and odd numbered lines derived from the luminance field, said chroma fields and luminance field being derived in sequence, means for converting the recorded tracks into an electrical signal such that positions along the track are converted into time positions, means responsive to the signal for separating luminance field information from information from the two chroma fields, means including a line interval store for processing the lines of the separated two chroma fields so that adjacently numbered even and odd lines of the two chroma fields are simultaneously derived, and means for combining the simultaneously derived lines with each other and a line from the separated luminance field.

13. A system for recording a polychrome video signal on a magnetic recording tape comprising:

a source of video signal including components representative of three sequentially derived image fields, the first and second image field components having relatively narrow bandwidths and being respectively indicative of first and second chromas, the third image field components having a relatively wide bandwidth and containing additional information necessary to form a color image, said source further including means for modulating the chroma and wideband components onto separate carriers, means including helical scanning means in which three transducers successively scan diagonal tracks along the tape responsive to the signal for magnetically recording, to s substantial depth, a first set of lines of the first field on first regions of said tracks on the tape and a second set of lines of the second field on other regions of said tracks on the tape, each of said sets of lines being approximately half the lines in the respective field, and means responsive to the signal for magnetically recording, to a depth considerably less than the substantial depth, the third image field over the same regions of the same tracks on which the chroma fields were recorded.

* * * * *